United States Patent [19]

Imura

[11] Patent Number: 5,854,947
[45] Date of Patent: Dec. 29, 1998

[54] VIBRATION REDUCING APPARATUS

[75] Inventor: Yoshio Imura, Kawasaki, Japan

[73] Assignee: Nikon Corporation, Tokyo, Japan

[21] Appl. No.: 876,594

[22] Filed: Jun. 16, 1997

[30] Foreign Application Priority Data

Jun. 18, 1996 [JP] Japan .................................. 8-156700
Jun. 18, 1996 [JP] Japan .................................. 8-156723

[51] Int. Cl.$^6$ .................................................. G03B 17/00
[52] U.S. Cl. ............................................................ 396/55
[58] Field of Search ...................... 396/55, 13; 348/208; 359/554–557

[56] References Cited

U.S. PATENT DOCUMENTS 5,444,512  8/1995  Morizumi ................................. 396/55

FOREIGN PATENT DOCUMENTS 06067246  3/1994  Japan .
07294994  11/1995  Japan .
9-80286  3/1997  Japan .
9-90190  4/1997  Japan .

Primary Examiner—W. B. Perkey

[57] ABSTRACT

A vibration reducing apparatus includes a vibration reducing optical system for reducing vibrations, a frame for holding the vibration reducing optical system, a first driving force generation device for driving the frame in a first direction on a plane substantially perpendicular to the optical axis of a main optical system, a second driving force generation device for driving the frame in a second direction perpendicular to the first direction on the plane, and a guide portion for guiding the frame in a guide direction that is skewed relative to the first and second directions at predetermined angles, and moving the frame in a direction perpendicular to the guide direction.

9 Claims, 8 Drawing Sheets

VIBRATION REDUCING APPARATUS

The entire disclosure of Japanese Patent Application Nos. 8-156700 and 8-156723 including specifications, claims, drawings, and summaries is incorporated herein by reference.

BACKGROUND OF THE INVENTION

1. Field of the Invention

The present invention relates to a vibration reducing apparatus for reducing vibrations produced by, e.g., camera shake of a camera or the like.

2. Related Background Art

Japanese Laid-Open Patent Application No. 6-67246 discloses a vibration reducing apparatus which comprises a vibration reducing lens, a fixing frame, a holding frame, and a lens barrel.

The fixing frame is a table that holds the vibration reducing lens, and moves in the horizontal direction (to be referred to as an X-direction hereinafter) with respect to the holding frame. The fixing frame slides along a first slide shaft arranged on the holding frame in the X-direction via bearings arranged thereon.

The holding frame is a table which moves in the vertical direction (to be referred to as a Y-direction herein after) with respect to the lens barrel together with the fixing frame. The holding frame comprises a second slide shaft arranged in the Y-direction. The second slide shaft is slidably supported by a housing fixed to the lens barrel.

Such vibration reducing apparatus positions the vibration reducing lens at an arbitrary position (on the X-Y coordinate system) in directions perpendicular to the optical axis in, e.g., the following procedure. That is, the holding frame and the fixing frame move together in the Y-direction with respect to the lens barrel, and thereafter, the fixing frame moves in the X-direction with respect to the holding frame.

Since the fixing and holding frames are driven by different constituting members, if they are driven by a common driving source, the moving amounts, moving velocities, and the like in the X- and Y-directions must be individually controlled.

For example, if the number of constituting members that drive the fixing frame is smaller than those for driving the holding frame, a driving source for driving the fixing frame suffers a kind of overspecifications in the entire apparatus.

Also, Japanese Laid-Open Patent Application No. 6-67246 above discloses a planar fixing frame 106 and steel balls 109 and 150 arranged to sandwich the fixing frame 106 therebetween, as shown in FIG. 10. The fixing frame 106 is a member for holding a vibration reducing lens (not shown), and can move by receiving a driving force in directions perpendicular to an optical axis I by a driving force generation device (not shown).

The steel ball 109 serves as a guide member used when the fixing frame 106 moves in the directions perpendicular to the optical axis I. The steel ball 109 is stored in a bore 108a formed on the surface of a lens barrel 108 on the fixing frame 106 side to be partially exposed therefrom, and is in rolling-contact with the surface of the fixing frame 106 on the side of the lens barrel 108.

Also, the steel ball 150 serves as a guide member used when the fixing frame 106 moves in the directions perpendicular to the optical axis I. The steel ball 150 is stored, together with a spring 153, in a storage hole of an adjustment pin 149 attached to a support member 107, and presses the fixing frame 106 against the steel ball 109 by the biasing force of the spring 153.

In this state, when a shock acts to the left in FIG. 10, the steel ball 150 moves to the left in FIG. 10 while flexing the spring 153.

The steel ball 150 is in point-contact with the surface of the fixing frame 106 on the support member 107 side, and the contact portion of the fixing frame 106 primarily receives the shock. At this time, since the spring 153 absorbs the shock, no pressed mark of the steel ball 150 is formed on the contact portion of the fixing frame 106.

In the above-mentioned conventional vibration reducing apparatus, the spring 153 for biasing the fixing frame 106 against the steel ball 109 and the spring 153 for absorbing the shock acting on the fixing frame 106 are a single member. Shocks that act on the fixing frame 106 are strong in principle, and the spring 153 must have an elastic force high enough to absorb such shocks.

However, if the spring 153 is set at a strong elastic force, an excessive frictional force acts between the steel balls 109 and 150, and the fixing frame 106. Such frictional force also becomes an excessive load for the driving force generation device for driving the fixing frame 106.

In the state shown in FIG. 10, when a shock acts on the fixing frame 106 to the right in FIG. 10, the fixing frame 106 receives the shock at the contact portion with the steel ball 109, and a pressed mark of the steel ball 109 is formed on the surface of the fixing frame 106.

SUMMARY OF THE INVENTION

It is an object of the present invention to provide a vibration reducing apparatus which can drive a frame in both the X- and Y-directions under the same conditions.

It is another object of the present invention to provide a vibration reducing apparatus which can absorb a shock independently of the acting direction of the shock with respect to the optical axis of the main optical system.

It is still another object of the present invention to provide a vibration reducing apparatus which can reliably stop the frame even when an excessive shock acts on the frame.

In order to achieve the above objects, according to the first aspect of the present invention, there is provided a vibration reducing apparatus comprising a vibration reducing optical system for reducing vibrations, a frame for holding the vibration reducing optical system, a first driving force generation device for driving the frame in a first direction on a plane substantially perpendicular to an optical axis of a main optical system, a second driving force generation device for driving the frame in a second direction perpendicular to the first direction on the plane, and a guide portion for guiding the frame in a guide direction that is skewed relative to the first and second directions at predetermined angles, and moving the frame in a direction perpendicular to the guide direction.

Preferably, the second direction is skewed relative to the first direction at substantially right angles, and the guide direction is set in a direction which is skewed relative to the first and second directions at substantially 45°.

In the first aspect of the present invention, since the apparatus comprises the guide member for guiding the frame in the guide direction that is skewed relative to the first and second directions at the predetermined angle, and moving the frame in the direction perpendicular to the guide direction, the vibration reducing optical system can be precisely and reliably moved to an arbitrary position on a plane substantially perpendicular to the optical axis by a single guide member with a simple structure.

When the second direction is set to be skewed relative to the first direction at substantially right angles, and the guide direction is set in substantially a 45° direction with respect to the first and second directions, first, identical driving loads can be produced in the first and second driving force generation devices independently of the driving direction of the vibration reducing optical system, and movable members can have identical masses; second, the first and second driving force generation devices can have identical characteristics, and can be driven by the same driving control method; and third, the characteristics of the first and second driving force generation devices can be optimized, and the driving control can be simplified.

According to the second aspect of the present invention, there is provided a vibration reducing apparatus comprising a vibration reducing optical system for reducing vibrations, a frame for holding the vibration reducing optical system, a driving force generation device for driving the frame in a predetermined direction which is substantially perpendicular to an optical axis of a main optical system, and a guide portion for guiding the frame in a guide direction, which direction is skewed relative to the predetermined direction at a predetermined angle, and moving the frame in a direction perpendicular to the guide direction.

In the second aspect of the present invention, since the frame is driven in the predetermined direction by the single driving force generation device, and the guide portion is set in the direction to be skewed relative to this predetermined direction at the predetermined angle, first, the vibration reducing optical system can be precisely and reliably moved to an arbitrary position on a plane substantially perpendicular to the optical axis by the single driving force generation device and the guide portion; second, the setting space for the guide portion need not be selected in the vibration reducing apparatus, and the guide portion can be set at an arbitrary position in a limited space in the apparatus; and third, since only one driving force generation device is required, the entire vibration reducing apparatus can be made compact.

According to the third aspect of the present invention, there is provided a vibration reducing apparatus comprising a vibration reducing optical system for reducing vibrations upon being driven in directions substantially perpendicular to an optical axis of a main optical system, a frame for holding the vibration reducing optical system, a driving force generation device for driving the frame, a guide portion for guiding the frame in a predetermined direction, the guide portion comprising a first guide member having a guide surface, and a second guide member having a contact portion which is in contact with the guide surface, a biasing portion for biasing the guide surface and the contact portion in a direction to bring them into contact with each other, and permitting the guide surface and the contact portion to move in a direction to separate from each other, and a shock absorbing portion for absorbing a shock exceeding an allowable shock produced between the guide surface and the contact portion.

Preferably, the shock absorbing portion comprises an elastic member which is arranged on at least one of the first and second guide members, and absorbs a shock in a direction of the optical axis of the vibration reducing optical system.

The vibration reducing apparatus preferably further comprises a frame stopper for stopping the frame when the guide surface and the contact portion move in the direction to separate from each other. Also, the contact portion is stored in a storage portion formed on the second guide member to partially protrude from the storage portion, and the vibration reducing apparatus preferably further comprises a movement restraint portion for restraining a moving distance between the guide surface and the contact portion so as to prevent the contact portion from being removed from the storage portion when the guide surface and the contact portion move in the direction to separate from each other.

Preferably, the second guide member comprises a stop portion for stopping the guide surface of the first guide member when the shock absorbing portion absorbs the shock.

In the third aspect of the present invention, since the shock absorbing portion for absorbing the shock that exceeds the allowable shock is arranged between the guide surface and the contact portion, the shock absorbing portion can reliably absorb the shock and, hence, a dent (pressed mark) can be prevented from being formed by the shock between the guide surface and the contact portion. Since formation of a dent (pressed mark) can be prevented, no load variations are produced upon driving the frame. For this reason, the frame can be stably and reliably moved, and accurate vibration reduction can be attained. Furthermore, the frame can be smoothly moved with a low load in a plane perpendicular to the optical axis.

When the frame stopper is formed, the frame can be reliably stopped when the guide surface and the contact portion move in the directions to separate from each other. On the other hand, when the movement restraint portion for restraining the moving distance when the guide surface and the contact portion are separate from each other, the contact portion can be reliably prevented from being removed from the storage portion.

Furthermore, when the second guide member has the stop portion for stopping the guide surface of the first guide member, the frame can be reliably received by the guide surface of the second guide member, and a dent (pressed mark) can be reliably prevented from being formed by a shock on the guide surfaces of the first and second guide members.

According to the fourth aspect of the present invention, there is provided a vibration reducing apparatus comprising a vibration reducing optical system for reducing vibrations upon being driven in directions substantially perpendicular to an optical axis of a main optical system, a frame for holding the vibration reducing optical system, a driving force generation device for driving the frame, a guide portion for guiding the frame in a predetermined direction by contact portions formed at three positions to be separated at 120° angular intervals to have an optical axis of the vibration reducing optical system as a center, and a biasing portion for biasing the guide portion against the contact portions.

In the fourth aspect of the present invention, since the three contact portions are arranged to be separated at 120° angular intervals to have the optical axis of the vibration reducing optical system as the center, even when the frame is driven by the driving force generation device, the frame can be prevented from rotating about the optical axis, and a pinch load can be reliably prevented from acting on the frame.

The above and other objects, features and advantages of the present invention will be explained hereinafter and may be better understood by reference to the drawings and the descriptive matter which follows.

DETAILED DESCRIPTION OF THE PREFERRED EMBODIMENTS (First Embodiment)

A single-lens reflex camera that uses a vibration reducing apparatus according to this embodiment will be described below to explain the outline of this vibration reducing apparatus.

Figure 8:
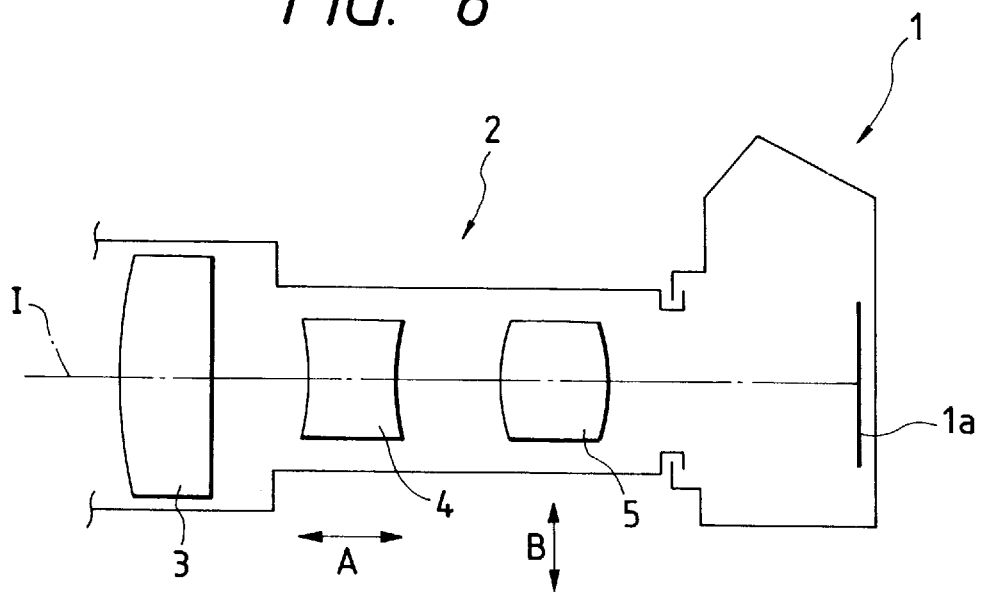
FIG. 8 is a schematic sectional view showing a single-lens reflex camera that uses the vibration reducing apparatus according to the first embodiment of the present invention.

FIG. 8 is a schematic sectional view showing a single-lens reflex camera that uses the vibration reducing apparatus according to the first embodiment.

A lens barrel 2 is attached to a camera body 1. The lens barrel 2 comprises a phototaking lens system made up of a first lens group 3, a second lens group 4 which performs focus adjustment to form an image of an object on an imaging surface 1a by moving in a direction (A-direction in FIG. 8) parallel to an optical axis I, and a third lens group 5 (to be referred to as a vibration reducing (VR) lens hereinafter) for reducing vibrations when it is driven in directions perpendicular to the optical axis (i.e., in a B-direction in FIG. 8 and a direction perpendicular to the plane of drawing of FIG. 8).

Figure 9:
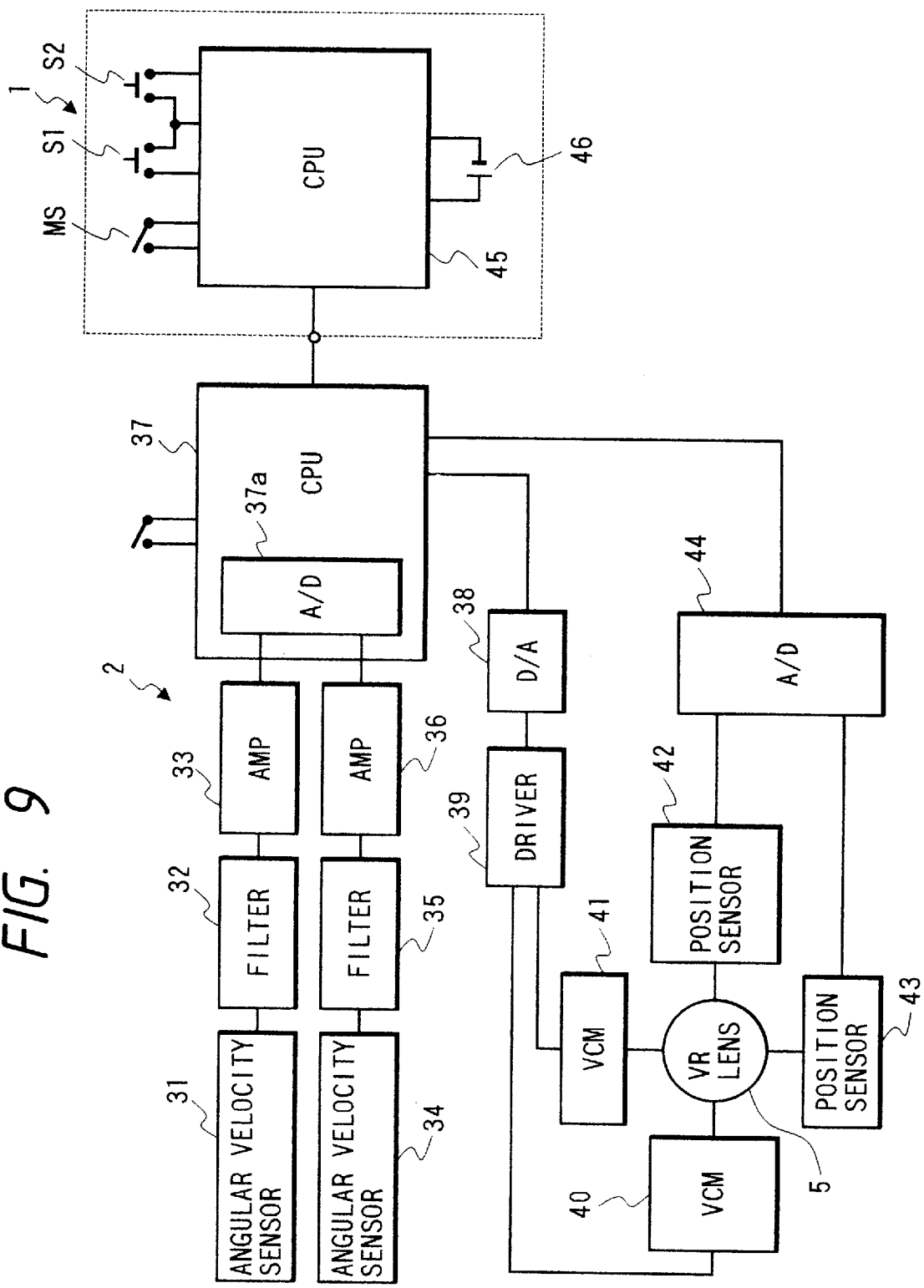
FIG. 9 is a block diagram of the vibration reducing apparatus according to the first embodiment of the present invention.
Figure 10:
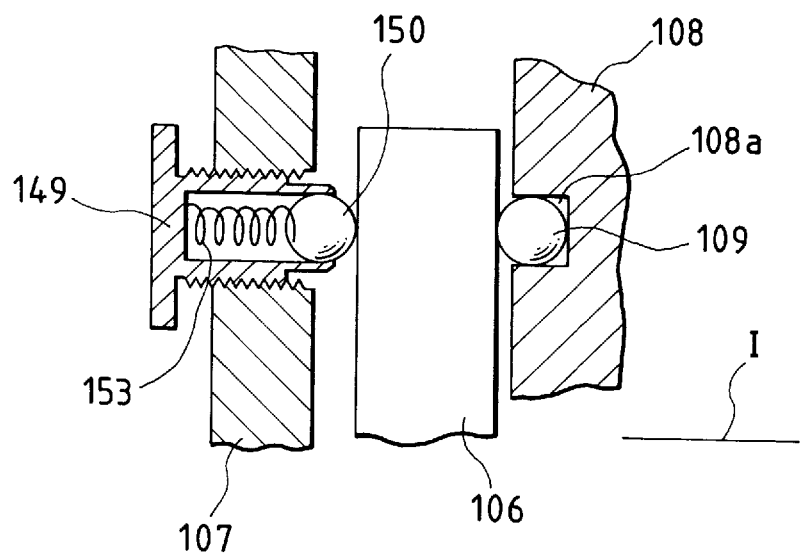
FIG. 10 is a sectional view showing a principal part of a conventional vibration reducing apparatus.

FIG. 9 is a block diagram of the vibration reducing apparatus according to the first embodiment.

Angular velocity sensors 31 and 34 detect vibrations of the camera body 1 and the lens barrel 2 in the horizontal and vertical directions, and their outputs are amplified by amplifiers 33 and 36 via filters 32 and 35 and are then input to a CPU 37.

The CPU 37 A/D-converts the input signals by its internal A/D converter 37a, and performs predetermined processing of the digital signals to generate vibration reduction control signals. The outputs from the CPU 37 are D/A-converted by a D/A converter 38, and analog signals are input to voice coil motors (VCMs) 40 and 41 via a driver 39.

The VCMs 40 and 41 are motors for driving the VR lens 5, and their structures will be described later with reference to FIGS. 1 and 2.

Position sensors 42 and 43 detect the positions of the VR lens 5, and their detection signals are fed back to the CPU 37 after they are A/D-converted by an A/D converter 44.

The camera body 1 comprises a CPU 45 for making various kinds of control, a power supply battery 46, a main switch (power switch) MS, a half-stroke switch S1 which is turned on at the half-stroke position of a release button, and a full-stroke switch S2 which is turned on at the full-stroke position of the release button.

The CPU 45 communicates with the CPU 37 to transmit information.

The driving mechanism for driving the VR lens 5 will be explained below.

Figure 1:
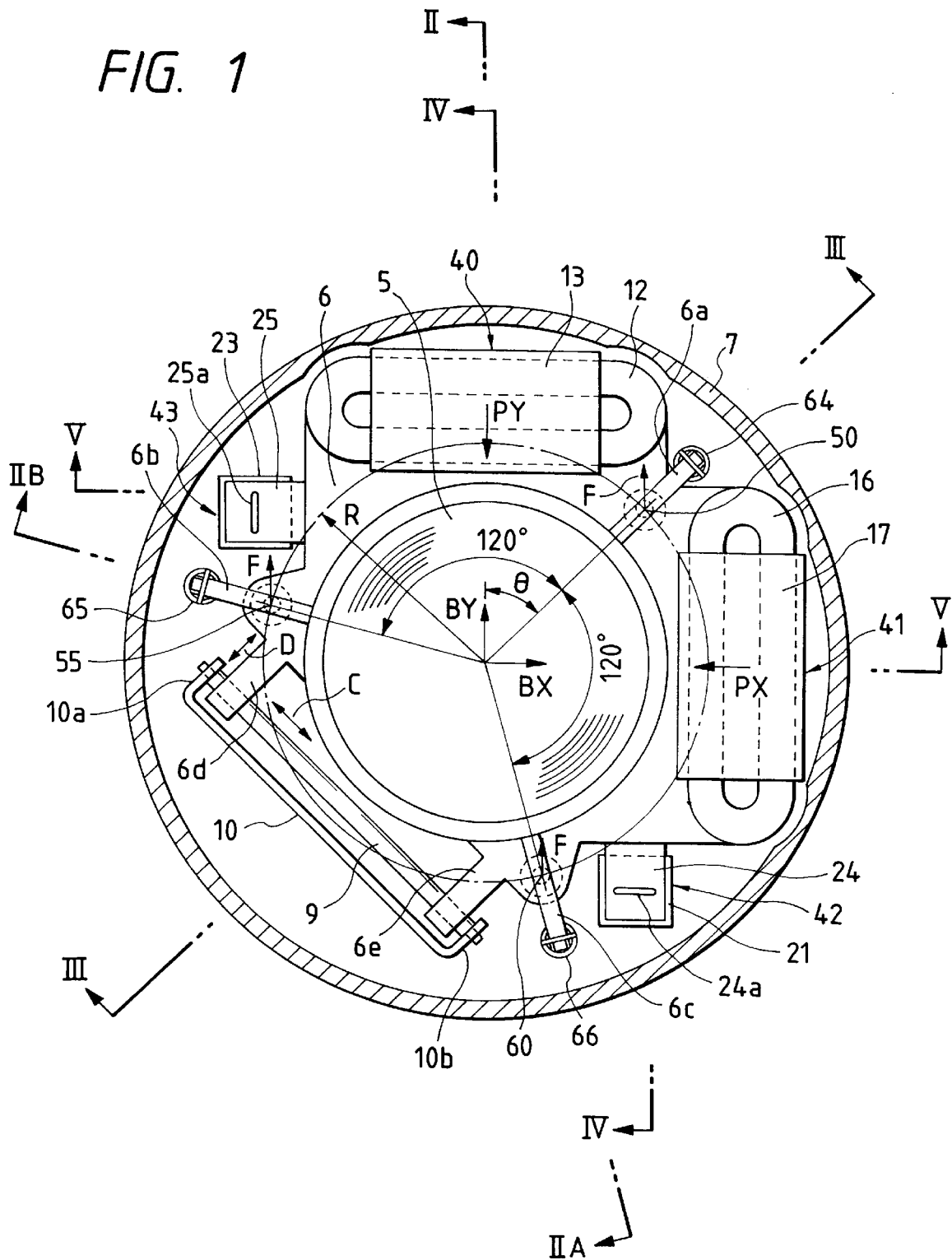
FIG. 1 is a sectional view showing a principal part of the first embodiment of a vibration reducing apparatus according to the present invention.
Figure 2:
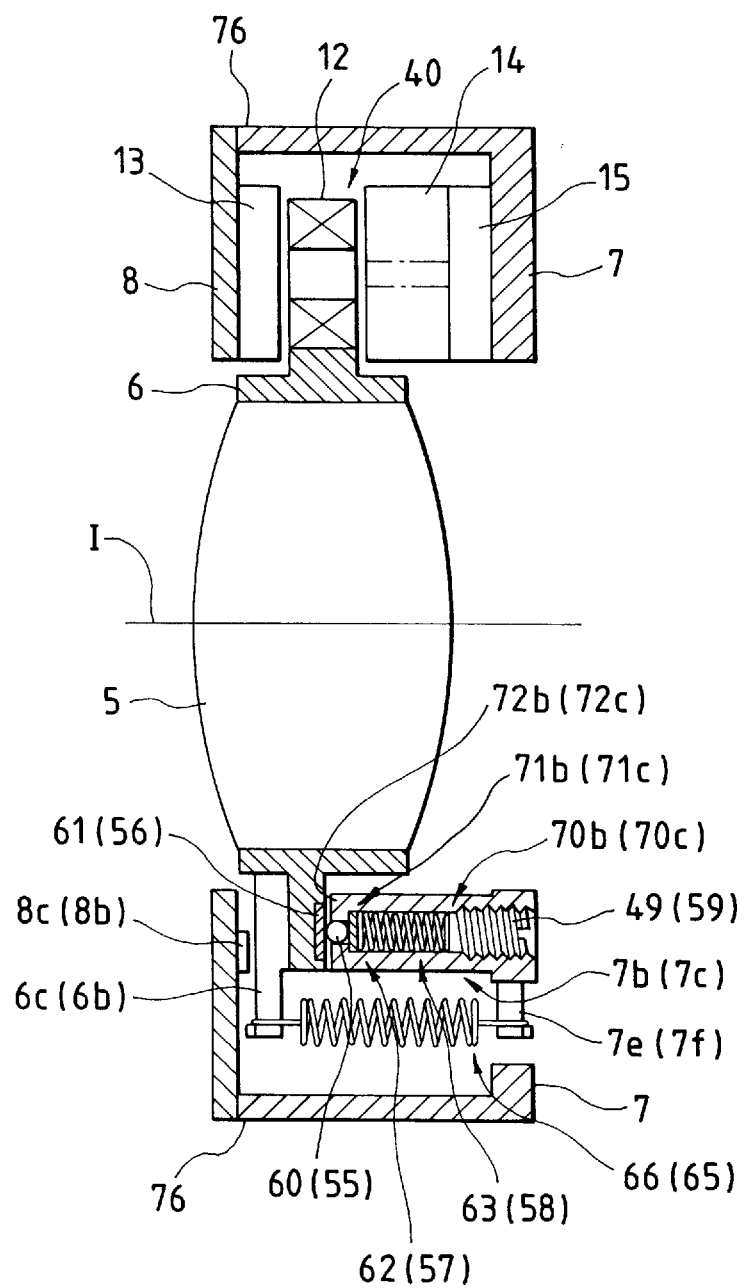
FIG. 2 is a sectional view taken along a line II–IIA in FIG. 1.
Figure 3:
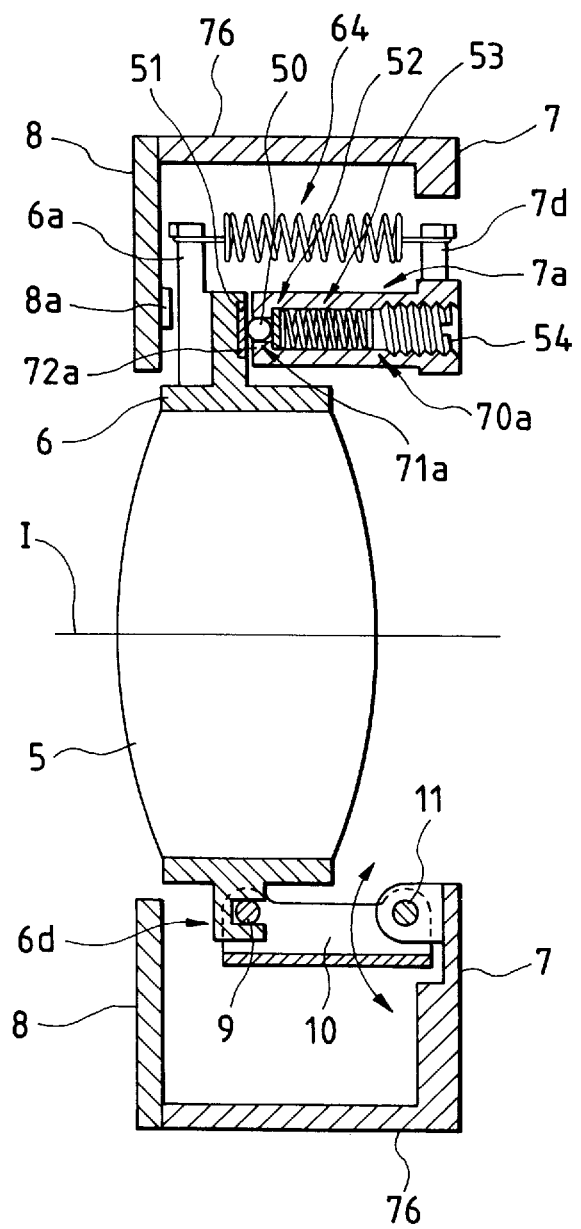
FIG. 3 is a sectional view taken along a line III—III in FIG. 1.

FIG. 1 is a sectional view showing the vibration reducing apparatus according to the present invention, FIG. 2 is a sectional view taken along a line II–IIA in FIG. 1, and FIG. 3 is a sectional view taken along a line III—III in FIG. 1. Note that FIG. 2 shows, in parentheses, the reference numerals of members in the sectional view taken along a line II–IIB in FIG. 1.

A lens frame 6 holds the VR lens 5, and has spring rests 6a, 6b, and 6c, and hooks 6d and 6e, which are formed on its outer periphery, as shown in FIG. 1. Also, coils 12 and 16 of the VCMs 40 and 41 (see FIG. 2), and slit members 24 and 25 (see FIG. 4) are attached to the lens frame 6.

Furthermore, steel ball butt members 51, 56, and 61 are formed on the lens frame 6 on the sides of steel balls 50, 55, and 60 of the lens frame 6, as shown in FIGS. 2 and 3.

The steel ball butt members 51, 56, and 61 are in contact with the steel balls 50, 55, and 60, and serve as guide members for guiding the movement of the lens frame 6 when the lens frame 6 moves in the directions perpendicular to the optical axis I.

The steel ball butt members 51, 56, and 61 consist of a metal harder than the steel balls 50, 55, and 60. The surfaces of the steel ball butt members 51, 56, and 61 are preferably formed as a flat surface so as to be in surface-contact with end faces 72a, 72b, and 72c of steel ball built-in portions 7a, 7b, and 7c (to be described later).

The steel balls 50, 55, and 60 are members that allow smooth movement of the lens frame 6, and are preferably arranged to have the positional relationship shown in FIG. 1 therebetween. As shown in FIG. 1, the steel balls 50, 55, and 60 are set at positions separated by a distance R perpendicularly from the optical axis I. The steel ball 50 is set at a position separated by an angle e with respect to an axis extending from the optical axis I in a BY-direction (to be referred to as a BY-direction axis hereinafter). The steel balls 55 and 60 are distributed at 120° angular positions from the position of the steel ball 50.

In the state shown in FIG. 1, when the VR lens is driven by the VCM 40, a thrust PY of the VCM 40 is generated downward along the BY-direction axis, as shown in FIG. 1. A frictional force F is produced at the contact portions between the steel balls 50, 55, and 60, and the steel ball butt members 51, 56, and 61.

A counterclockwise moment produced by the frictional force F at the contact portions of the steel balls 50 and 60, and a clockwise moment produced by the frictional force F at the contact portion of the steel ball 55 satisfy the following relations about the intersection between the BY-direction axis and an axis in a BX-direction (to be referred to as a BX-direction axis hereinafter):

$$F \cdot R \sin \theta + F \cdot R \sin (180-120-\theta) = F \cdot R \sin (120-\theta)$$

$$\sin \theta + \sin (60-\theta) = \sin (120-\theta)$$

The above relations hold even when $\theta = 0$ to $180°$ is substituted, and the counterclockwise and clockwise moments balance each other.

As can be seen from the above description, the VR lens 5 never rotates about the intersection between the BY- and BX-direction axes even when it is driven by the VCM 40. Accordingly, no pinch load is produced by the moments between the hooks 6d and 6e of the lens frame 6, and a guide shaft 9 (to be described later).

Springs 64, 65, and 66 are biasing members for biasing the lens frame 6 toward the steel balls 50, 55, and 60. One-end portions of the springs 64, 65, and 66 are attached to the spring rests 6a, 6b, and 6c, respectively. In the embodiment of the present invention, the total of the biasing forces generated at the three springs 64, 65, and 66 is preferably 1.5 to 5 times the total weight of all the members that move together with the VR lens 5, i.e., the total weight (to be referred to as W hereinafter) of the VR lens 5, the lens frame 6, the coils 12 and 16, the steel ball butt members 51, 56, and 61, and the slits 24 and 25. That is, the total of the biasing forces is preferably set at 1.5 W to 5 W.

A base member 7 is used for attaching steel ball built-in portions 7a, 7b, and 7c, a shaft 11, and the like (to be described later). Spring rests 7d, 7e, and 7f are attached to the base member 7, as shown in FIGS. 2 and 3. The other end portions of the springs 64, 65, and 66 are attached to the spring rests 7d, 7e, and 7f.

Figure 4:
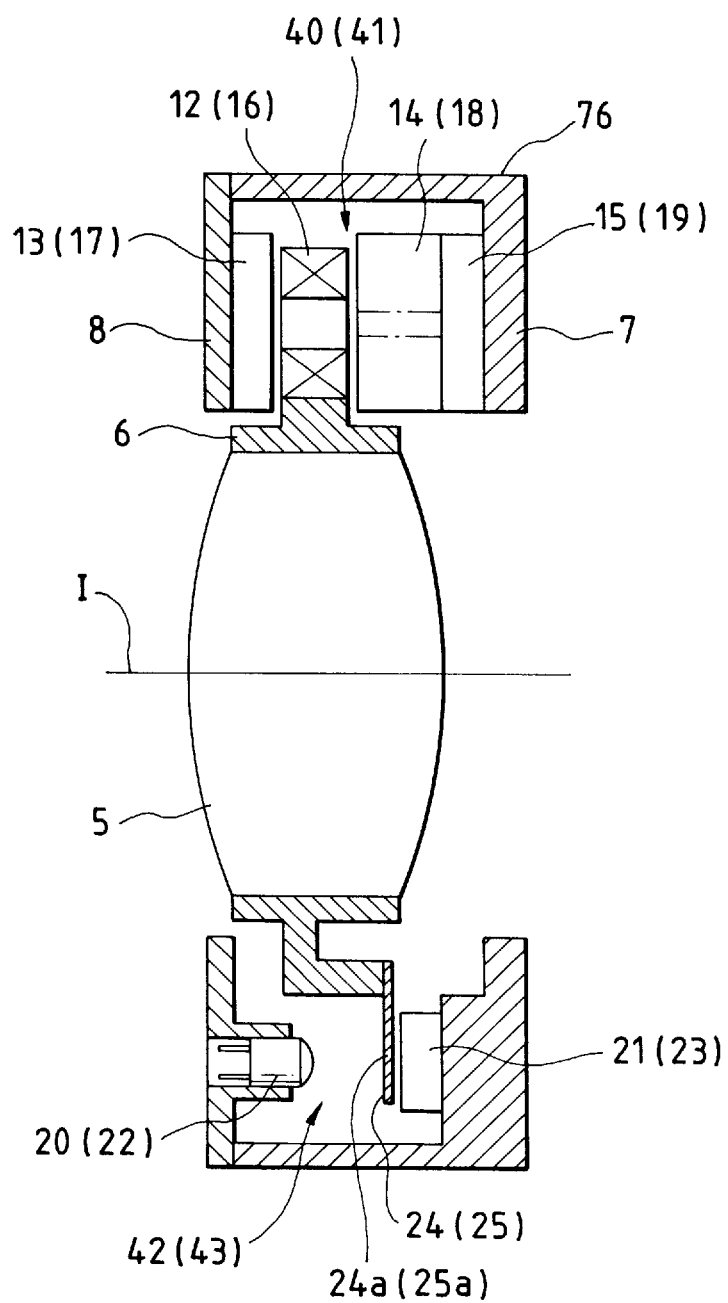
FIG. 4 is a sectional view taken along a line IV—IV in FIG. 1.

Also, yokes 15 and 19 of the VCMs 40 and 41, and light-receiving elements (PSDs) 21 and 23 of the position sensors 42 and 43 are attached to the base member 7, as shown in FIGS. 2 and 4.

A lid member 8 protects the driving mechanism made up of the VCMs 40 and 41, and the like for driving the VR lens 5. The lid member 8 is attached to a flange portion 76 formed on the edge portion of the base member 7.

Yokes 13 and 17 of the VCMs 40 and 41, and light-emitting elements (LEDs) 20 and 22 of the position sensors 42 and 43 are attached to the inner surface of the lid member 8, as shown in FIGS. 2 and 4. Also, lens frame stoppers 8a, 8b, and 8c are attached to the inner surface of the lid member 8, as shown in FIGS. 2 and 3.

The lens frame stoppers 8a, 8b, and 8c are members for stopping the lens frame 6c, and restraining the moving distance of the lens frame 6 to fall within the predetermined range when the lens frame 6 moves to the left in FIGS. 2 and 3.

The surfaces of the lens frame stoppers 8a, 8b, and 8c are preferably formed as a flat surface so as to be in surface-contact with the lens frame 6. The distances between the lens frame stoppers 8a, 8b, and 8c and the lens frame 6 are preferably selected to prevent the steel balls 50, 55, and 60 from being removed from steel ball storage portions 71a, 71b, and 71c when the steel ball butt members 51, 56, and 61 and the end faces 72a, 72b, and 72c are separated relative to each other.

The guide shaft 9 serves as a member for guiding the lens frame 6 when the lens frame 6 moves in the directions perpendicular to the optical axis I. The guide shaft 9 is set in a direction (C-direction in FIG. 1) that is skewed relative to both the BX and BY directions at predetermined angles. The hooks 6d and 6e slidably engage with the guide shaft 9.

A guide arm 10 is a member for moving the lens frame 6 in the direction parallel to the guide direction (C-direction in FIG. 1) of the guide shaft 9. The guide arm 10 has bent portions 10a and 10b at its two end portions, which rotatably support the guide shaft 9.

As shown in FIG. 3, a portion of the guide arm 10 on the base member 7 side is supported by a shaft 11 to be rotatable in the direction of the arrow in FIG. 3. When the guide arm 10 rotates, the lens frame 6 can move in the direction (D-direction in FIG. 1) perpendicular to the guide direction (C-direction in FIG. 1) of the guide shaft 9.

The VCMs 40 and 41 respectively apply forces in the BY and BX directions to the lens frame 6, thereby driving the lens frame 6, as shown in FIG. 1. The VCMs 40 and 41 have the same structure except that they apply forces in different directions to the lens frame 6, and the VCM 40 alone will be explained below with reference to FIG. 2.

The VCM 40 is made up of the coil 12, the yoke 13, a permanent magnet 14, and the yoke 15. The permanent magnet 14 and the yoke 15 are fixed to each other. The yoke 12 is arranged between the yoke 13 and the permanent magnet 14. A magnetic field is formed between the yoke 13 and the permanent magnet 14. When a current is supplied to the coil 12, the VP lens 5 is driven by a force in the BY-direction. When the current supplied to the coil 12 is reversed, the VP lens 5 is driven by a force in the opposite direction.

The position sensors 42 and 43 respectively detect the positions of the VR lens 5 in the BY- and BX-directions. The position sensor 42 alone will be described below with reference to FIG. 4.

FIG. 4 is a sectional view taken along a line IV-IV in FIG. 1. Note that FIG. 4 shows, in parentheses, the reference numerals of members in the sectional view taken along a line V-V in FIG. 1.

The position sensor 42 is made up of a slit 24a, the LED 20, and the PSD 21. The slit 24a is formed on the slit member 24 fixed to the lens frame 6. The slit 24a is arranged between the LED 20 and the PSD 21.

Light emitted by the LED 20 passes through the slit 24a, and reaches the PSD 21. When the slit 24a formed on the lens frame 6 moves, the position of light that has passed through the slit 24a and reaches the PSD 21 also moves. The changes in position of light change the output signal of the PSD 21. The position of the VR lens 5 in the BY-direction is detected based on such changes in output signal.

The steel ball built-in portions 7a, 7b, and 7c are members for holding the steel balls 50, 55, and 60, and the steel ball built-in portion 7a alone will be explained below with reference to FIG. 3.

The steel ball built-in portion 7a is made up of a compression spring storage portion 70a that stores a steel ball butt member 52 and a compression spring 53 for compressing the steel ball butt member 52, a screw 54 for fixing the steel ball butt member 52 and the compression spring 53 in the compression spring storage portion 70a, and a steel ball storage portion 71a which extends from the bottom portion of the compression spring storage portion 70a to the end face 72a of the steel ball built-in portion 7a and stores the steel ball 50.

The steel ball butt member 52 is a guide member that stops the steel ball 50 which is in contact with the steel ball butt member 52, and consists of a metal harder than the steel ball 50. The steel ball butt member is preferably formed to have a planar shape so as to be in point-contact with the steel ball 50.

The compression spring 53 is a member for biasing the steel ball butt member 52 toward the lens frame 6 side. In the embodiment of the present invention, the total of the biasing forces generated in the three compression springs 53, 58, and 63 is preferably set at twice the total of the biasing forces of the three springs 64, 65, and 66. For example, if the total of the biasing forces of the three springs 64, 65, and 66 is 1.5W, the total of the biasing forces of the three compression springs 53, 58, and 63 is preferably set at 3 W or more. With this setting, the VR lens 5 can be supported at the position shown in FIGS. 1, 2, 3 and 4 in any posture.

The steel ball storage portion 71a stores the steel ball 50 which slightly protrudes from the end face 72a. Since the inner diameter of the steel ball storage portion 71a is smaller than that of the compression spring storage portion 70a, the steel ball butt portion 52 never jumps out from the interior of the compression spring storage portion 70a by the compression spring 53.

The end face 72a serves as a guide member that stops the lens frame 6 when the lens frame 6 moves to the right in FIG. 3.

The operation of the first embodiment of the vibration reducing apparatus according to the present invention will be described below.

In the state depicted in FIG. 1, when the VCM 40 generates a downward thrust PY along the BY-direction axis to the lens frame 6, the lens frame 6 is moved by the thrust PY while sliding downwardly right along the guide shaft 9.

The guide arm 10 is pivoted by the thrust PY counterclockwise in the directions of the arrows in FIG. 3. The guide shaft 9 translates in the direction (D-direction in FIG. 9) perpendicular to the longitudinal direction of the guide shaft 9 upon pivoting of the guide arm 10.

The hooks 6d and 6e engage with the guide shaft 9 to permit it to slightly move in only the direction of the optical axis I, as shown in FIG. 3. Since the guide arm 10 pivots, the guide shaft 9 slightly moves in the direction of the optical axis I relative to the hooks 6d and 6e.

However, since the lens frame 6 is biased toward the steel balls 50, 55, and 60 by the three springs 64, 65, and 66, the steel balls 50, 55, and 60 restrain the movement of the lens frame 6 in the direction of the optical axis I.

In the state shown in FIG. 1, when the VCM 41 generates a leftward thrust PX along the BX-direction axis to the lens frame 6, the lens frame 6 is moved by the thrust PX while sliding upwardly left along the guide shaft 9. The guide shaft 9 is moved in the direction (D-direction in FIG. 1) perpendicular to the longitudinal direction of the guide shaft 9.

The lens frame 6 is movable to an arbitrary position in a plane perpendicular to the optical axis I. Since the lens frame 6 engages with the guide shaft 9 at the hooks 6d and 6e, its rotation about the optical axis I is reliably restrained.

In the state shown in FIGS. 2 and 3, when the lens frame 6 receives a strong force due to a rightward shock in FIGS. 2 and 3 (to be referred to as a shock hereinafter), the lens frame 6 begins to move to the right. Since the steel balls 50, 55, and 60 are in point-contact with the steel ball butt members 51, 56, 61, 52, 57, and 62, these steel ball butt members 51, 56, 61, 52, 57, and 62 primarily receive the shock at the point-contact portions with the steel balls 50, 55, and 60.

In this case, the steel ball butt members 51, 56, and 61 press the steel balls 50, 55, and 60 and the steel ball butt members 52, 57, and 62 to the right to flex the compression springs 53, 58, and 63. Since the compression springs 53, 58, and 63 absorb the shock, the steel ball butt members 51, 56, 61, 52, 57, and 62 do not receive any shock at the contact portions with the steel balls 50, 55, and 60, and no dents (pressed marks) are formed on the contact portions.

When the lens frame 6 receives a shock exceeding a setting value, the end faces 72a, 72b, and 72c stop the lens frame 6 while being in surface-contact with the steel ball butt members 51, 56, and 61 to interrupt its movement.

Therefore, no dents (pressed marks) are formed on the contact portions between the steel ball butt members 51, 56, and 61, and the end faces 72a, 72b, and 72c.

Note that the steel balls 50, 55, and 60 are clamped between the steel ball butt members 51, 56, and 61, and the steel ball butt members 52, 57, and 62 by the biasing forces of the springs 64, 65, and 66. Accordingly, even when the lens frame 6 moves to the right in FIGS. 2 and 3, the steel balls 50, 55, and 60 are never removed from the steel ball storage portions 71a, 71b, and 71c.

In the state shown in FIGS. 2 and 3, when the lens frame 6 receives a shock to the left in FIGS. 2 and 3, the lens frame 6 begins to move to the left against the biasing forces of the springs 64, 65, and 66. At this time, the steel ball butt members 51, 56, and 61, and the steel ball butt members 52, 57, and 62 move in a direction to separate from each other.

When the shock is small, the springs 64, 65, and 66 can absorb this shock. However, when the shock is large, the lens frame stoppers 8a, 8b, and 8c stop the lens frame 6 to suspend its movement. Since the lens frame 6 contacts the lens frame stoppers 8a, 8b, and 8c when it moves by a predetermined distance, the steel balls 50, 55, and 60 are never removed from the steel ball storage portions 71a, 71b, and 71c.

(Second Embodiment)

Figure 5:
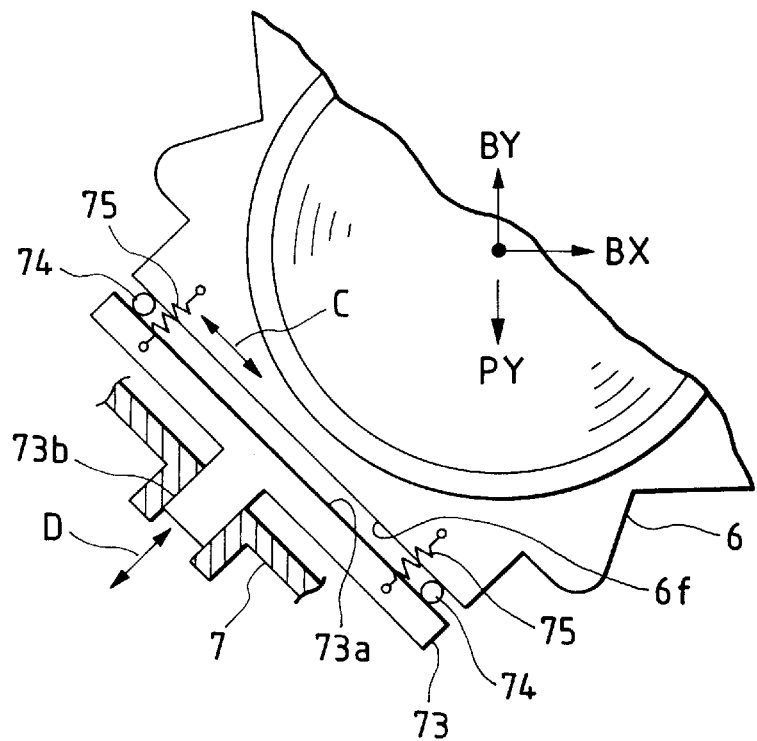
FIG. 5 is a sectional view showing a principal part of the second embodiment of a vibration reducing apparatus according to the present invention.

FIG. 5 shows the second embodiment of a vibration reducing apparatus according to the present invention.

In the following description, the same reference numerals in this embodiment denote the same members as in the first embodiment, and a detailed description thereof will be omitted.

The lens frame 6 of the second embodiment is formed with a first guide surface 6f which includes an axis in a direction (C-direction in FIG. 5) that is skewed relative to both the BY- and BX-directions at predetermined angles. The first guide surface 6f guides the lens frame 6 when the lens frame 6 moves in directions perpendicular to the optical axis I.

A guide member 73 is a member for moving the lens frame 6 in a direction parallel to the axis in the C-direction in FIG. 5. The guide member 73 is made up of a second guide surface 73a and a third guide surface 73b, which is slidably guided by a base member 7, so as to move the lens frame 6 in a direction (D-direction in FIG. 5) perpendicular to the axis of the C-direction in FIG. 5.

Roll members 74 allow the lens frame 6 to slide in the C-direction in FIG. 5 on the second guide surface 73a, and are arranged between the first and second guide surfaces 6f and 73a.

Springs 75 are members for biasing the guide member 73 toward the lens frame 6 via the roll members 74. The springs 75 permit the lens frame 6 to slide in the C-direction in FIG. 5 with respect to the guide member 73 but restrain the lens frame 6 from separating from the guide member 73.

The operation of the second embodiment of the vibration reducing apparatus according to the present invention will be described below.

In the state depicted in FIG. 5, when the VCM 40 generates a downward thrust PY along the BY-direction axis to the lens frame 6, the lens frame 6 is moved by the thrust PY while sliding downwardly right on the second guide surface 73a. Also, the lens frame 6 moves the guide member 73 downwardly left by the thrust PY.

Since the lens frame 6 is coupled to the guide member 73 via the springs 75, it moves downwardly left in the D-direction in FIG. 5 together with the guide member 73, and also moves downwardly right in the C-direction in FIG. 5 with respect to the guide member 73.

Since the lens frame 6 can move to an arbitrary position in a plane perpendicular to the optical axis I and is coupled to the guide member 73 via the springs 75, its rotation about the optical axis I can be restrained.

(Third Embodiment)

Figure 6:
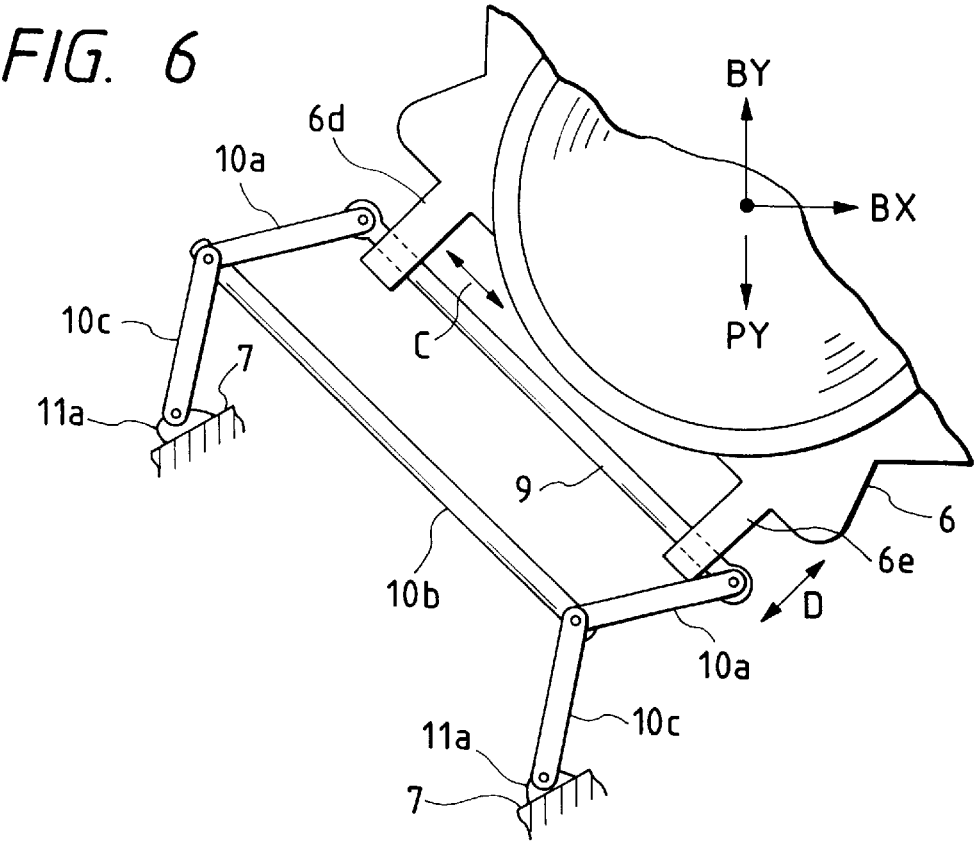
FIG. 6 is a sectional view showing a principal part of the third embodiment of a vibration reducing apparatus according to the present invention.

FIG. 6 shows the third embodiment of a vibration reducing apparatus according to the present invention.

As shown in FIG. 6, the guide shaft 9, a pair of first link members 10a, a coupling shaft 10b, and a pair of second link members 10c build a parallel link mechanism.

The two ends of the guide shaft 9 are rotatably coupled to one-end portions of the pair of first link members 10a, the other end portions of which are rotatably coupled to the two end portions of the coupling shaft 10b. The two end portions of the coupling shaft 10b are rotatably coupled to one-end portions of the pair of second link members 10c, the other end portions of which are rotatably coupled to a pair of bearings 11a fixed to the base member 7.

The operation of the third embodiment of the vibration reducing apparatus according to the present invention will be described below.

The VCM 40 slidably moves the lens frame 6 downwardly right on the guide shaft 9 by a downward thrust PY along the BY-direction axis.

Also, the thrust PY of the VCM 40 translates the guide shaft 9 in a direction (D-direction in FIG. 6) perpendicular to its longitudinal direction.

In the third embodiment described above, the hooks 6d and 6e need not engage with the guide shaft 9 to allow the guide shaft 9 to slightly move in the direction of the optical axis I, as shown in FIG. 3.

Since the link members, the coupling shaft, and the like can be arranged in a plane perpendicular to the optical axis I, the interval between the base member 7 and the lid member 8 can be reduced, and the entire apparatus can be made compact.

(Fourth Embodiment)

Figure 7:
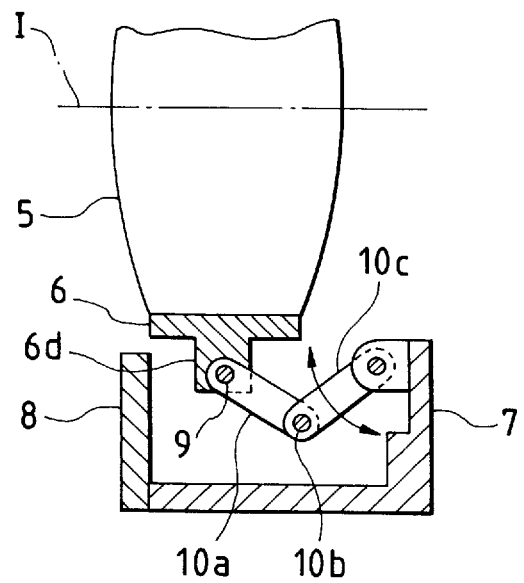
FIG. 7 is a sectional view showing a principal part of the fourth embodiment of a vibration reducing apparatus according to the present invention.

FIG. 7 shows the fourth embodiment of a vibration reducing apparatus according to the present invention.

In the fourth embodiment, the first and second link members 10a and 10c in the third embodiment are arranged in a plane parallel to a plane including the optical axis I.

In the fourth embodiment, the hooks 6d and 6e need not engage with the guide shaft 9 to allow the guide shaft 9 to slightly move in the direction of the optical axis I as in the third embodiment.

Since the link members and the like can be arranged in the plane parallel to the plane including the optical axis I, the space defined between the base member 7 and the lid member 8 can be reduced, and the entire apparatus can be made compact, as shown in FIG. 7.

(Another Embodiment)

In the above description, the VCM 40 generates a downward thrust PY along the BY-direction axis, but may generate an upward thrust along the BY-direction axis. Similarly, the VCM 41 may generate a rightward thrust along the BX-direction axis.

In the above description, the VCMs 40 and 41 are independently driven, but may be driven simultaneously.

In each of the embodiments of the present invention, the VCMs 40 and 41 are preferably arranged, so that their driving directions are skewed relative to each other at substantially right angles, and the guide shaft 9 is preferably arranged to be skewed relative to these driving directions at about 45°. When these members are arranged to have such positional relationship therebetween, identical driving loads can be produced in the VCMs 40 and 41 independently of the driving direction of the lens frame 6. Also, movable members can have identical masses, and the VCMs 40 and 41 can have identical characteristics and can be driven by a common driving control method. Furthermore, the characteristics of the VCMs 40 and 41 can be optimized, and the driving control can be simplified.

In each of the embodiments of the present invention, one of the VCMs 40 and 41 may be omitted, and one guide member may be arranged to be skewed relative to the driving direction of one VCM at a predetermined angle. Even with such layout, the VR lens can be precisely and reliably moved to an arbitrary position in a plane substantially perpendicular to the optical axis I. Also, the setting space of the guide member need not be specific in the vibration reducing apparatus, and the guide member can be set at an arbitrary position in the limited space in the apparatus. Furthermore, since the number of VCMs is reduced to one, the entire vibration reducing apparatus can be made compact.

Furthermore, in each of the embodiments of the present invention, the springs 64, 65, and 66 for biasing the lens frame 6 toward the steel balls 50, 55, and 60, and the compression springs 53, 58, and 63 for absorbing the shock are made up of different members. Therefore, since the shock is absorbed by the compression springs 53, 58, and 63, the springs 64, 65, and 66 need not have biasing forces that are strong enough to absorb the shock. In this case, even when the biasing forces of the springs 64, 65, and 66 are increased, the loads produced between the lens frame 6 and the steel balls 50, 55, and 60 do not increase. Also, the forces of the springs 64, 65, and 66, and the compression springs 53, 58, and 63 can be ideally set.

Moreover, in each of the embodiments of the present invention, the shock is absorbed by the compression springs 53, 58, and 63, but may be absorbed by, e.g., rubber members as long they have elastic forces high enough to absorb the shock. On the other hand, the steel balls 50, 55, and 60 may be arranged on the lens frame 6 side, and the steel ball butt members 52, 57, and 62, and the compression springs 53, 58, and 63 alone may be arranged on the base member 7 side.

In FIGS. 2 and 3, when the lens frame 6 receives a shock to the left in FIGS. 2 and 3 and the shock is small, the springs 64, 65, and 66 absorb the shock, needless to say.

Since no dents (pressed marks) are formed by the shock at the contact portions between the steel ball butt members 51, 56, 61, 52, 57, and 62, and the steel balls 50, 55, and 60, the lens frame 6 does not suffer any load variations upon driving, and can stably and reliably move, thus attaining accurate vibration reduction. Furthermore, the lens frame 6 can move smoothly with a low load in a plane perpendicular to the optical axis I.

Having described preferred embodiments of the present invention, it is to be understood that any variations will occur to those skilled in the art within the scope of the appended claims.

What is claimed is:

1. A vibration reducing apparatus comprising:

a vibration reducing optical system for reducing vibrations;

a frame for holding said vibration reducing optical system;

a first driving force generation device for driving said frame in a first direction on a plane substantially perpendicular to an optical axis of a main optical system;

a second driving force generation device for driving said frame in a second direction perpendicular to the first direction on the plane; and a guide portion for guiding said frame in a guide direction that is skewed relative to the first and second directions at predetermined angles, and moving said frame in a direction perpendicular to the guide direction.

2. An apparatus according to claim 1, wherein the second direction is skewed relative to the first direction at substantially right angles, and the guide direction is set in a direction skewed relative to the first and second directions at substantially 45°.

3. A vibration reducing apparatus comprising:

a vibration reducing optical system for reducing vibrations;

a frame for holding said vibration reducing optical system;

a driving force generation device for driving said frame in a predetermined direction which is substantially perpendicular to an optical axis of a main optical system; and a guide portion for guiding said frame in a guide direction which is skewed relative to the predetermined direction at a predetermined angle, and moving said frame in a direction perpendicular to the guide direction.

4. A vibration reducing apparatus comprising:

a vibration reducing optical system for reducing vibrations upon being driven in directions substantially perpendicular to an optical axis of a main optical system;

a frame for holding said vibration reducing optical system;

a driving force generation device for driving said frame;

a guide portion for guiding said frame in a predetermined direction, said guide portion including a first guide member having a guide surface, and a second guide member having a contact portion which is in contact with the guide surface;

a biasing portion for biasing the guide surface and the contact portion in a direction to bring them into contact with each other, and permitting the guide surface and the contact portion to move in a direction to separate from each other; and a shock absorbing portion for absorbing a shock exceeding an allowable shock produced between the guide surface and the contact portion.

5. An apparatus according to claim 4, wherein said shock absorbing portion comprises an elastic member which is arranged on at least one of said first and second guide members, and absorbs a shock in a direction of the optical axis of said vibration reducing optical system.

6. An apparatus according to claim 4, further comprising a frame stopper for stopping said frame when the guide surface and the contact portion move in the direction to separate from each other.

7. An apparatus according to claim 4, wherein the contact portion is stored in a storage portion formed on said second guide member to partially protrude from the storage portion, and said apparatus further comprises a movement restraint portion for restraining a moving distance between the guide surface and the contact portion so as to prevent the contact portion from being removed from the storage portion when the guide surface and the contact portion move in the direction to separate from each other.

8. An apparatus according to claim 4, wherein said second guide member comprises a stop portion for stopping the guide surface of said first guide member when said shock absorbing portion absorbs the shock.

9. An apparatus according to claim 4, wherein said contact portion is formed at three positions to be separated at 120° angular intervals to have an optical axis of said vibration reducing optical system as a center.

* * * * *